United States Patent [19]

Franz et al.

[11] 4,404,254

[45] Sep. 13, 1983

[54] PRODUCTION OF LAMELLAR IRON OXIDE PIGMENTS

[75] Inventors: Gerhard Franz; Franz Hund, both of Krefeld, Fed. Rep. of Germany

[73] Assignee: Bayer Aktiengesellschaft, Leverkusen, Fed. Rep. of Germany

[21] Appl. No.: 281,134

[22] Filed: Jul. 7, 1981

Related U.S. Application Data

[63] Continuation of Ser. No. 112,383, Jan. 15, 1980, abandoned.

[30] Foreign Application Priority Data

Feb. 7, 1979 [DE] Fed. Rep. of Germany ....... 2904491

[51] Int. Cl.$^3$ ..................... C01G 49/02; C04B 35/26; C01G 49/08
[52] U.S. Cl. .................................. 428/329; 428/692; 428/900; 106/304; 252/62.56; 252/62.59; 252/62.62; 350/375; 423/632; 423/633; 423/634
[58] Field of Search ....................... 106/304; 423/633; 252/62.56; 428/329, 692, 900

[56] References Cited

U.S. PATENT DOCUMENTS

| | | | |
|---|---|---|---|
| 2,558,303 | 6/1951 | Marcot | 423/633 |
| 3,276,894 | 10/1966 | Hund | 106/304 |
| 3,382,174 | 5/1968 | Hund | 423/634 |
| 3,869,298 | 3/1975 | Suzuki | 106/304 |
| 3,987,156 | 10/1976 | Nobuoka | 106/304 |
| 4,053,325 | 10/1977 | Vanderheiden | 106/304 |
| 4,140,538 | 5/1979 | Hund | 106/304 |
| 4,140,539 | 2/1979 | Hund | 423/633 |
| 4,233,283 | 11/1980 | Ado | 106/304 |

FOREIGN PATENT DOCUMENTS

| | | | |
|---|---|---|---|
| 1219612 | 6/1966 | Fed. Rep. of Germany | 106/304 |
| 49-44878 | 11/1974 | Japan | 106/304 |
| 50-24146 | 8/1975 | Japan . | |

OTHER PUBLICATIONS (Anon.), "Properties of Austrian Micaceous Iron Oxide", *Pigment and Resin Technology*, vol. 5, No. 5, (May 1976), pp. 14-16.
*Chemical Abstracts*, vol. 83, 1975, Nos. 45368f, 45369g.

*Primary Examiner*—Brian E. Hearn
*Attorney, Agent, or Firm*—Sprung, Horn, Kramer & Woods

[57] ABSTRACT

Synthetic, hexagonal, lamellar iron oxide particles, suitable as corrosion-inhibiting or decorative colored pigments, containing about 0.1 to 12% by weight of at least one oxide of an element of the IVth, Vth or VIth Main and Secondary Groups and of the IInd Secondary Group of the Periodic System of Elements.

16 Claims, 5 Drawing Figures

PRODUCTION OF LAMELLAR IRON OXIDE PIGMENTS

This is a continuation of application Ser. No. 112,383, filed Jan. 15, 1980 now abandoned.

Hexagonal lamellar iron oxides have already been used for numerous applications. If the oxides are present in the crystal structure of hematite, they are used as red coloring pigments and also as anti-corrosion pigments. It has already been proposed to use lamellar iron oxides in the crystal structure of magnetite or meghemite as magnetic pigments in magnetic recording supports. Magnetite pigments are also used as black coloring pigments.

The properties of the coloring anti-corrosion and magnetite pigments are determined to a very considerable extent by the geometric form of the individual particles. The use of lamellar iron oxides is limited inter alia by the fact that the geometric form of the particles is determined by the process used for their production. More particularly, the layer thickness growth and the growth in the lamella plane cannot be controlled separately in known production processes. Although the external geometric form of the iron oxide particles can be varied to a certain extent by varying individual parameters of a production process or by using very different production processes, other specific properties, such as porosity, defect structure and impurities are influenced by each production process, with the result that certain applications are limited or ruled out altogether.

Accordingly there is considerable commercial interest in the production of lamellar iron oxide particles of which the geometric form, i.e. the ratio of lamella diameter to lamella thickness, is largely independent of the production process used.

It has now been found that new iron oxide pigments such as these can be obtained thereby providing certain substances according to the present invention which influence the crystallization tendency, are incorporated substantially homogeneously into the crystal and are present during the growth of the crystals.

Accordingly, the present invention provides hexagonal lamellar iron oxide particles containing about 0.1 to 12% by weight of at least one of the oxides of the elements of the IVth, Vth and/or VIth Main and/or Secondary Group and/or of the IInd Secondary Group of the Periodic System of the elements.

The iron oxide particles according to the present invention preferably contain oxides of the elements silicon, germanium, zinc, titanium, zirconium or phosphorus. Iron oxide particles containing about 0.1 to 9% by weight of $SiO_2$ are particularly preferred. Contents of about 0.1 to 1% by weight of the modifying substance are generally sufficient. In some cases, contents of the 0.2 to 0.8% by weight of the modifying substants are preferred.

The lamellar iron oxide particles according to the present invention may have diameters of about 0.5 to $100\mu$, the ratio between the diameter and thickness of the particles being between about 4 and 200 and preferably between about 10 and 100. Preferred particle geometries are determined by the particular application envisaged. For example pigments having a diameter of less than about $10\mu$ and a diameter to thickness ratio of about 10 to 50 are preferably used as magnetic pigments. Red coloring pigments may be obtained in colors varying from blueish red to yellowish red with a more or less pronounced metal sheen, depending upon the particle geometry.

The present invention also provides a process for the production of hexagonal, lamellar iron oxide particles which is characterized in that compounds of at least one of the elements of the IVth, Vth and/or VIth Main and/or Secondary Group and/or of the IInd Secondary Group of the Periodic System of the elements are present during the growth of the iron oxide particles or of identically shaped precursor crystal particles.

The process according to the present invention may be carried out in similar fashion to all known processes for the production of lamellar iron oxide particles. For example, it is possible to use a process according to U.S. Pat. No. 3,864,463 in which the iron oxide particles are obtained by thermally decomposing $FeCl_3$ with oxygen. In this case, the modifying substances which influence the crystal habit are introduced in the form of volatile compounds (for example silanes) together with the oxygen or the chlorine. However, the products are less suitable for use in anti-corrosion paints because of their chlorine content.

The process according to the present invention is preferably carried out as a hydrothermal process, for example in accordance with the procedures of French Pat. No. 638,200 or German Pat. No. 541,768.

The preferred process for producing iron(III)oxide pigments made up of hexagonal, lamellar individual particles is characterized in that suitable iron compounds are heated in aqueous suspension either in an autoclave or in a tube reactor to temperatures above the temperature at which complete conversion of the particular iron(III)compound used into $\alpha\text{-}Fe_2O_3$ just occurs, compounds of at least one of the elements of the IVth, Vth and/or VIth Main and/or Secondary Group and/or of the IInd Secondary Group of the Periodic System of the elements additionally being present in the aqueous suspension during its hydrothermal treatment in quantities of about 0.05 to 20% by weight, based on the iron content of the suspension.

The lamellar iron oxide pigments obtained have the crystal structure of hematite and may be converted into magnetite or maghemite pigments in known manner by reduction and re-oxidation.

Iron compounds suitable for the process of the present invention are amorphous iron(III)hydroxides, which are formed during the hydrolysis or iron(III) or iron(II)-salts in the presence of suitable oxidizing agents, and iron(III)oxide hydroxides of any crystal modification ($\alpha$-, $\beta$-, $\gamma$-, $\delta$-, or $\epsilon$-FeOOH). In addition, it is also, of course, possible to use other iron compounds which are converted under the applied hydrothermal conditions into the above-mentioned hydroxides or oxide hydroxides or directly into hematite. It is preferred to start with readily obtainable iron(III)oxide hydroxide suspensions of the type which accumulate, for example, in the oxidation of scrap with air in acid aqueous solutions or in the reduction or organic nitro compounds with metallic iron.

The concentration of the iron compound in the suspension may be varied within wide limits, the lower limit ultimately being determined solely by the economy of the process. An upper limit is imposed on the solids contents of the suspension by the greatly increasing viscosities which make homogeneous mixing impossible, which is reflected of course in a deterioration in the quality of the products.

The pH-value of the suspension before hydrothermal treatment is adjusted in known manner in accordance with the required particle diameter of the hematite crystals to be produced.

Thus, particles having diameters of a few micrometers are obtained in strongly alkaline suspensions, whereas in neutral or acid media it is only possible to obtain a very much more finely divided product with particle sizes of less than 1 micrometer. The pH-value is adjusted in known manner with an alkali hydroxide, alkali oxide or alkali carbonate, preferably with sodium hydroxide, when alkaline suspensions are necessary, or with mineral acids, preferably with sulphuric acid, in the case of acid suspensions.

The particle size of the lamellae to be produced is further determined by the particle size of the iron compound used. The larger the lamellae, the more finely divided the iron compound used.

The minimal temperature required for complete conversion of the iron(III)compound used during the hydrothermal treatment is always above 100° C. and is otherwise determined by the type and quantity of the iron(III)compound, by the type and quantity of the ions additionally present in the suspension, by the pH-value of the suspension and also by the reaction time. An upper temperature limit is imposed solely by apparatus conditions. The temperature range below the critical point of the solution used, i.e. generally below 374° C., is of technical interest because unnecessarily high pressures would otherwise be developed in the autoclave or tube reactor, making the process difficult to carry out.

Preferred compounds of elements of the IVth, Vth and/or VIth Main and/or Secondary Group and/or of the IInd Secondary Group of the Periodic System are compounds of silicon, germanium, zinc, titanium, zirconium or phosphorus. The compounds in question may be any compounds, provided that they do not react with the iron compound used to form insoluble ferrites under the applied process conditions. The compouns may be dissolved in the suspension or may be in the form of the fine particles.

It is particularly preferred to use silicon-containing substances. They may be introduced into the suspension as finely divided silicon dioxide, as a silicate of any cations, as an ester, or in the form of other compounds of silica, such as for example silicones, which hydrolize at elevated temperatures in aqueous media.

It is generally sufficient to use quantities of about 0.1 to 10% by weight, expressed as the oxide of the particular compound, based on the iron content of the suspension. It is particularly preferred to use those substances which influence the crystal appearance in quantities of about 0.2 to 2% by weight of oxide, based on the iron content of the suspension.

The presence of the element of the IVth, Vth, and/or VIth Main and/or Secondary Group and/or of the IInd Secondary Group of the Periodic System of elements during the hydrothermal treatment influences the growth thickness of the lamellar hematite crystals. For a substantially constant diameter of the particles predetermined by the other process parameters, such as the starting substances used, the temperature, other impurities, if any, and in particular by the pH-value, there is a substantially linear relationship between the thickness of the particles and the quantity of crystallization tendency influencing substance ultimately incorporated into the particle, the lamellae being thinner the larger the quantity of substance being incorporated.

The various substances influencing the crystallization tendency have a different effect with regard to changing the thickness of the lamellae. The effect is also dependent upon other process parameters. For example, an $SiO_2$ content in the hematite lamellae in the alkaline range has a greater influence on the thickness of the lamellae than in the acid range. Other modifying subsances which influence crystallization tendency have a greater effect in the acid range than in the alkaline range, such as phosphate for example. Accordingly, the quantitative influence on the thickness of the lamellae has to be determined by preliminary tests for the other predetermined process parameters in each individual case, and the quantity and type of crystallization tendency modifying agent required to obtain a certain ratio between lamella diameter and thickness have to be determined from the results of this test.

The necessary reaction times for the hydrothermal treatment are determined both by the composition of the suspension used and also by the external conditions of the intermittent or continuous hydrothermal treatment, such as for example the heating-up time of the autoclave, the reaction temperature and also possibly the throughput. For each test condition, therefore, there is a minimum reaction time which is necessary for guaranteeing complete conversion of the iron(III)compound used into $\alpha$-$Fe_2O_3$. Since an increase in the duration of the hydrothermal treatment does not significantly effect the products formed consistent reaction times of 4 hours were applied in the following examples in the case of batch operation. Where tube reactors are used, there is a similar dependence upon temperature, residence time and throughput. However, there is nothing in these observations to imply a limitation of the process according to the present invention with regard to the reaction times, because it is also possible, for example, to produce the lamellar hematite particles according to the invention with a treatment time of 1 minute.

After the hydrothermal treatment, the products are worked up in known manner by filtration and repeated washing with water until no more foreign substances can be detected in the filtrate. The products are best dried at around 110° C. However, it is also possible to apply higher temperatures without the properties of the products being affected.

Several measured vlues were used for characterizing the products in the following examples. For the hexagonal lamellar particles of hematite produced by the process according to the present invention, determination of the geometric dimensions is of particular importance. The lamella diameter is understood to be the diameter of the circle circumscribing the hexagonal surface of the crystals. It may be determined by measuring out from electron microscope photographs of the particles. Provided that the crystals are sufficiently large, it is of course also possible to use optical microscope photographs. Since the lamella diameters are not all the same but are distributed over a certain range, the values quoted in the examples were determined by approximation to the mean value from a whole number of particles.

The invention will be further described with reference to the accompanying drawings wherein.

Figure 1:
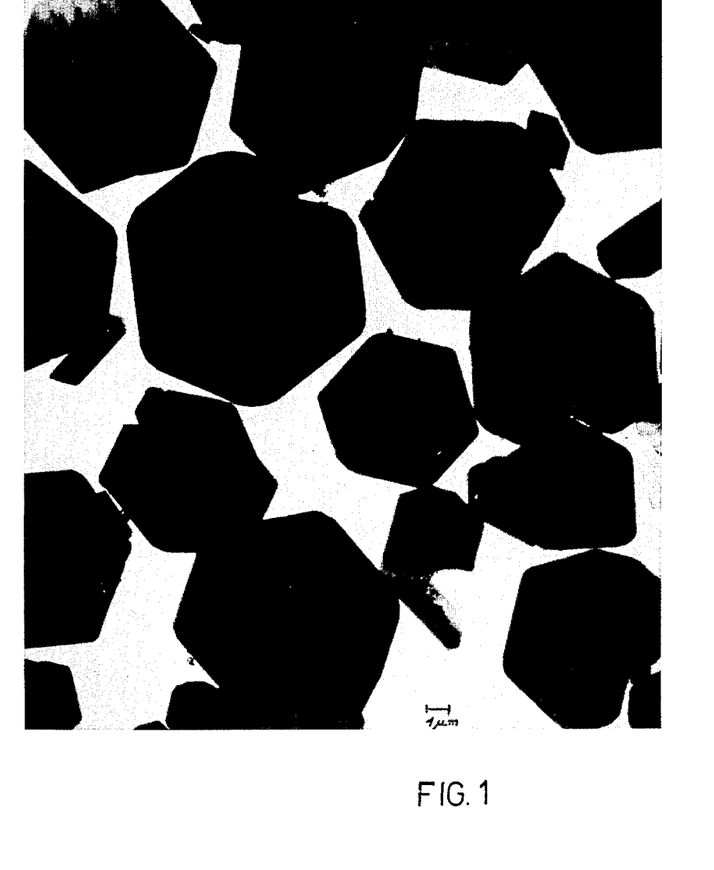
FIG. 1 is a photomicrograph of crystals produced in accordance with the present invention.

Referring now more particularly ot the drawings, FIG. 1 shows part of an electron microscope photograph of the hexagonal lamellar hematite crystals produced by the process according to the present invention.

Figure 2:
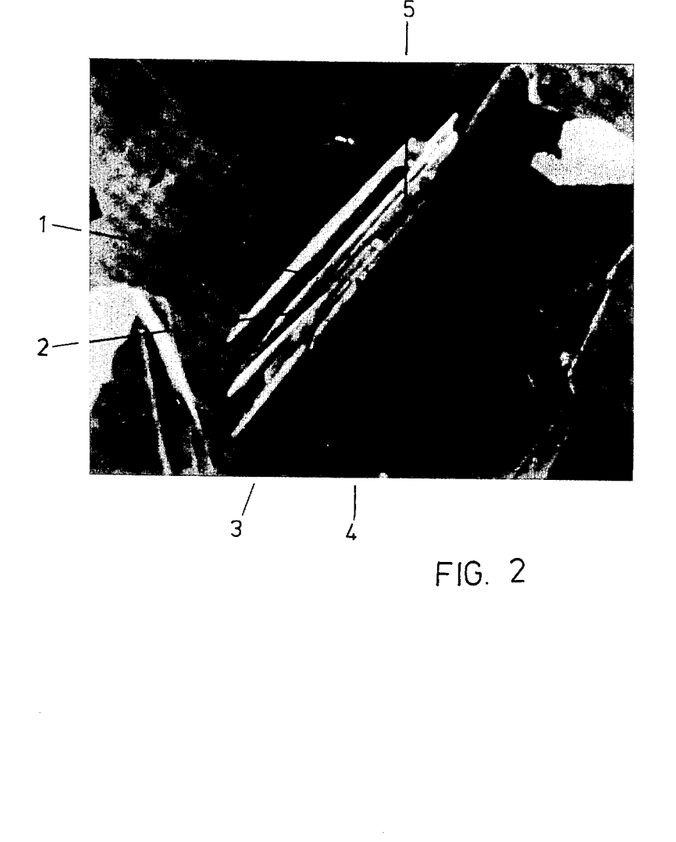
FIG. 2 is a photomicrograph of iron oxide pigment particles in accordance with the present invention.

The thickness of the lamellae may be determined by measuring under an electron scan microscope. In this respect, it is of course only those crystals in which the surface normal to the boundary surface to be measured lies parallel to the viewing direction which are used for evaluation. By way of illustration, particles of this type are denoted by the numbers 1 to 5 in FIG. 2 which reproduces an electron scan microscope photograph of an iron oxide pigment produced by the process according to the present invention. In addition to this method there is another way of determining the thickness of the lamellae in the case of non-porous pigment particles. Thus it may be calculated by simple geometric considerations from the lamella diameter measured by the above method and the BET surface.

Another characteristic property of the lamellar hematite particles produced by the process according to the present invention is their smaller X-ray crystallite size in comparison with conventional products. For the purposes of determination, it is best to elect a reflex at lattice planes which lie parallel or at least substantially parallel to the (001) lattice plane of the hematite (hexagonal indication) which appears as a lamella surface in the individual crystal. The readily evaluatable reflex at the (104)-lattice plane has provided to be particularly suitable for this purpose. The X-ray crystallite size determined at this reflex is directly related to the means lamella thickness of the pigment particles.

The pigments according to the present invention also differ characteristically in their color from conventional iron oxide pigments. They are characterized by a comparatively distinctly increased lightness coupled with a reduced contribution to brightness. This increased lightness, which is in consequence of the minimal thickness of the lamellae, is visually reflected in a pleasant metallic sheen, particularly in the case of large particle diameter. These differences in color may be quantitatively determined by colorimetric measurements. The CIELAB-color systems was used for evaluation, lightness being denoted in the symbol $L^*$ ("metric lightness"), brightness by the symbol $C^*_{ab}$ ("metric chroma") and the color angle by the symbol $H°$ ("metric hue angle").

It is known that the crystal lattices of iron oxides show a certain solubility for oxides of other ions, particularly those of the elements of the IIIrd Main Group. In the case of conventional iron oxides consisting of isometric or acicular particles, this effect has already been utilized for varying their properties, such as for example their color and their magnetic properties. The incorporation of aluminum (III) into the crystal lattice of α-iron oxide gives yellower red pigments, the incorporation of maganese (III) brown to black pigments and the incorporation of chromium (III) fine fast-brown pigments.

The magnetic properties of magnetite and maghemite crystals are influenced by the incorporation of manganese, cobalt, nickel or rhodium ions in a well-known manner. Particularly, the incorporation of cobalt ions is widely used in order to raise the coercive forces of conventional magnetites or maghemites consisting of isometric or acicular particles.

It has now been found that, when the process according to the present invention is carried out in the presence of compounds of trivalent elements whose cation radii require the co-ordination number 6 in oxygen compounds, particularly elements of the IIIrd Main Group, these compounds are incorporated as oxides into the lattice of the hexagonal lamellar iron oxides formed. In addition to aluminum, gallium and indium, other suitable elements are chromium, manganese, cobalt, rhodium and nickel in their trivalent oxidation state.

In principle, the lamellar iron oxide particles of the present invention may be used for the same applications as conventional, for example isometric or acicular iron oxides. In addition, their lamellar crystal appearance allows numerous other applications. Thus, it has already been proposed to use particles of the type in question for pigmenting corrosion-inhibiting or decorative coatings with a pronounced metallic sheen, suitable coating compositions being lacquers, enamels, glazes, plastics or synthetic resins. Hexagonal lamellar iron oxides also show the typical metallic sheen in plastic films or synthetic fibers of the type used for example for packaging purposes or textiles. In all these applications, the known properties of iron oxides, such as resistance to heat, weather, UV-light and chemicals, are of course also of considerable advantage. In addition, it has already been shown that lamellar iron oxides are eminently suitable for the production of ferrites having the crystal structure of spinel or barium hexaferrite.

In all the above-mentioned applications, the iron oxides of the present invention are superior to conventional lamellar iron oxides because the particular properties required may readily be optimized by adjusting certain geometric dimensions, i.e. certain ratios of diameter to thickness. This advantage is particularly noticeable in the case of lamellar magnetic iron oxides. Their magnetic properties are determined in large measure by the particle geometry of their hematite precursor crystals and, accordingly, may be varied within wide limits by the process according to the present invention. This opens up possibilities for the use of lamellar magnetic iron oxide particles in magnetic recording supports, such as magnetic tapes, cards or discs comprising one or more magnetizable layers. In this case, they may be used in admixture with conventional magnetic materials, for example with $CrO_2$, $Fe_3O_4$, $\gamma$-$Fe_2O_3$, mixed phases of $\gamma$-$Fe_2O_3$ with $Fe_3O_4$, $(Fe,Co)_3O_4$, $\gamma$-$(Fe, CO)_2O_3$, mixed phases of $\gamma$-$(Fe, Co)_2O_3$ with $(Fe, Co)_3O_4$ or with oxides characterized by strong magnetic anisotrophy, such as for example barium hexaferrite. In the case of multilayer recording supports, the lamellar iron oxides are used in the bottom, middle or upper layers while the other layers contain one of the above-mentioned conventional magnetic oxides characterized by a comparatively higher, identical or lower coercive force. However, several layers may also contain the lamellar iron oxides of the present invention, in which case the individual layers differ with regard to their magnetic properties and/or the spatial orientation of the individual crystals.

In addition, there are other applications for hexagonal lamellar iron oxides having the crystal structure of magnetite or maghemite in which the combination of their electromagnetic properties with the crystal habit is utilized. The magnetic interactions result in a strongly pronounced parallel orientation of the individual particles in coating materials. Accordingly, it is possible to obtain considerably higher packing densities in comparison with conventional iron oxides, which is reflected for example in an increased corrosion-inhibiting effect, in effective screening against electromagnetic interference fields and in a high level of conductivity.

The ready orientability of lamellar magnetic particles in magnetic fields and their light scattering power which differs according to the orientation of the lamellae relative to an incident light beam may be utilized for magneto-optical displays. The utilization of the Faraday effect enables the lamellar iron oxides of the present invention to be used for magneto-optical storage devices.

The invention is illustrated by the following examples:

EXAMPLE 1

(Comparison Example)

Acicular $\alpha$-FeOOH having a needle length of from 0.6 to 0.7$\mu$ and a needle diameter of from 0.1 to 0.2$\mu$, which is of the type obtained in the reduction of nitrobenzene with iron granules, was suspended in water and concentrated sodium hydroxide was added to the resulting suspension. Thereafter the suspension had an FeOOH content of 50 g/l and an NaOH content of 320 g/l. 500 ml of this suspension were introduced into a nickel vessel and then heated in an autoclave to 200° C. The hydrothermal treatment was over after 4 hours and the autoclave could be opened after cooling to below 100° C. The iron oxide formed was separated from the mother liquor by filtration and was washed with water until the filtrate ceased to show an alkaline reaction. The product consists of well developed hexagonal lamellar crystals of hematite. It has a red color heavily tinged with blue and shows a dull metallic sheen.

The hematite crystals had a mean diameter of 4.44 $\mu$m and a BET surface of 1.3 m$^2$/g. A diameter to thickness ratio of 12.7 was calculated therefrom. The product had an SiO$_2$ content of 0.086% by weight.

EXAMPLE 2

The procedure was that set out in Example 1, except that 0.5 g of a sodium silicate containing 33% of SiO$_2$ was added to the suspension before the hydrothermal treatment and was thoroughly mixed therewith by vigorous stirring.

The product consisted of well developed hexagonal lamellar crystals of hematite. It had a red color lightly tinged with blue and showed a pronounced metallic sheen. A mean diameter of 4.74 $\mu$m was determined by measuring under an electron microscope. A mean lamella thickness of 0.17 $\mu$m was calculated from the BET surface of 2.4 m$^2$/g and the above-mentioned diameter. This gave a value of 27.8 for the diameter to thickness ratio. The pigment had an SiO$_2$ content of 0.37% by weight.

EXAMPLE 3

The procedure was that set out in Example 2, except that the quantity of sodium silicate added was increased to 0.75 g. The product obtained again has a pronounced metallic sheen and a yellowish red color which was very similar to that of copper. The mean lamella diameter and the lamella thickness were determined from electron microscope photographs and amounted to 5.16 $\mu$m and 0.12 $\mu$m, respectively, from which a diameter to thickness ratio of 43 was calculated. The analytically determined SiO$_2$ content of the product amounted to 0.44% by weight.

Figure 3:
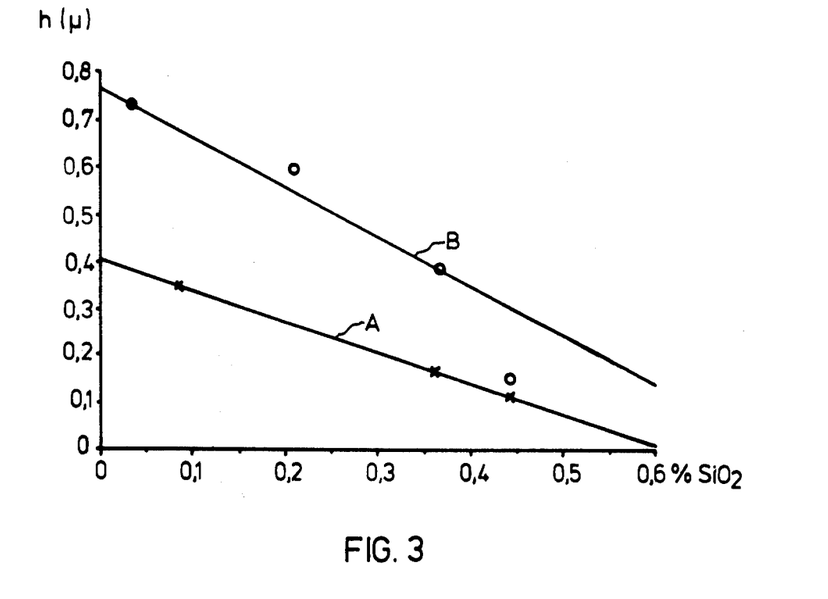
FIG. 3 is a plot showing the interrelationship of particle thickness and quantity of $SiO_2$ as additive.

The dependence of the particle thickness h upon the SiO$_2$ content of the particles is shown in curve A of FIG. 3 for Examples 1 to 3. The diameter of the particles differing in thickness may be assumed to be substantially constant within the accuracy of measurement and reproduction accuracy of the experiments.

Table 1 below shows the color values according to the CIELAB system.

TABLE 1

| Example No. | L* | C$_{ab}$* | H° |
|---|---|---|---|
| 1 | 42.8 | 9.8 | 33.6 |
| 2 | 49.0 | 14.9 | 35.4 |
| 3 | 49.7 | 16.2 | 36.2 |

EXAMPLES 4 TO 6

A very finely divided $\alpha$-FeOOH having an average needle length of 0.05$\mu$ and diameter of 0.01$\mu$, which is of the type obtained in the oxidation of freshly precipitated iron(II)hydroxide with air, was stirred with water and sodium hydroxide to form a viscous paste. Thereafter the suspension was 8 N in alkali and contained 50 g of FeOOH/e. Different quantities (see Table 2) of an aqueous suspension of finely divided SiO$_2$ powder (Aerosil, a product of Degussa) were then added with thorough mixing. The following hydrothermal treatment in an autoclave at 200° C. lasted 4 hours. The products formed were worked up in the usual way. They consisted of hexagonal crystals of hematite which, in the case of the products according to the present invention of Examples 5 and 6 (Table 2), showed a pronounced metallic sheen. The mean particle diameter d was determined by measuring under an optical microscope, while the mean particle thicknesses h were calculated from the BET surfaces and the particle diameters.

TABLE 2

| Example No. | SiO$_2$ in the suspension (% by weight, based on Fe—content) | SiO$_2$ in the end product (% by weight) | d ($\mu$m) | h ($\mu$m) | d/h | BET-surface (m$^2$/g) |
|---|---|---|---|---|---|---|
| 4 (Comparison) | 0.05 | <0.04 | 11.4 | 0.73 | 15.6 | 0.6 |
| 5 | 0.48 | 0.21 | 13.9 | 0.60 | 23.2 | 0.7 |
| 6 | 0.95 | 0.36 | 10.1 | 0.38 | 26.6 | 1.1 |

According to the color measurement, the products of Examples 5 and 6 showed a lightness L* higher by 2.6 and 5.4 points respectively than that of the comparison product of Example 4 which was produced without the addition of SiO$_2$. The dependence of the particle thickness h upon the SiO$_2$ content of the particles for Example 4 to 6 is shown in curve B of FIG. 3. The diameter of the particles may be assumed to be substantially constant within the accuracy of measurement and reproducibility of the experiments.

EXAMPLE 7

The starting material used was a suspension of α-FeOOH of the type which accumulates in the reduction of organic nitro compounds with silicon-containing iron. This suspension has an $SiO_2$ content of 0.89% by weight, based on the FeOOH-content. A 45% sodium hydroxide solution was added to and thoroughly mixed with the suspension. Thereafter the suspension contained 320 g/l of NaOH and 130 g/l of FeOOH. The following hydrothermal treatment was carried out at 240° C. and lasted 4 hours. The product obtained consisted of glistening crystals of α-$Fe_2O_3$ which, after incorporation into a lacquer, showed a conspicuous metallic sheen with a color similar to that of copper bronze. The mean diameter of the particles was determined by measuring under an optical microscope and amounted to 5.1 μm. A mean lamella thickness of 0.1 μm and a diameter to thickness ratio of 34 were calculated from the BET surface of 3.0 m²/g. The anaytically determined $SiO_2$ content amounted to 0.44% by weight.

The color values were as follows; $L^* = 52.9$, $C^*_{ab} = 19.4$, $H° = 36.5$.

The lamellar hematite crystals were reduced in a stream of moist hydrogen for 30 minutes at 400° C. in known manner. The magnetite crystals accumulating showed the same crystal appearance as their hematite precursor crystals and had the following magnetic powder data: coercive force 328 Oe, remanence 419 G cc $g^{-1}$. A magnetic tape having a coercive force of 352 Oe was produced from this material.

EXAMPLES 8 TO 10

A finely divided α-FeOOH was suspended in water in the manner as set out in Examples 4 to 6 and was then adjusted to a pH value of 2 by the addition of a little suphuric acid. This suspension had a solids concentration of 100 g/e. Different quantities (Table 3) of a finely divided $SiO_2$ powder were than added with vigorous stirring. The hydrothermal treatment of the suspension at 220° C. lasted 4 hours.

The products obtained were worked up in the usual way by filtration and repeated washing. The products had the properties shown in Table 2. The X-ray crystallite size was determined at the (104)-reflex of the hematite lattice.

TABLE 3

| Example No. | $SiO_2$ in the suspension (% by weight, based on Fe—content) | $SiO_2$ in the end product | BET surface (m²/g) | Crystallite size (A) |
|---|---|---|---|---|
| 8 (comparison) | 0.05 | <0.04 | 4.1 | 1600 |
| 9 | 1.0 | 0.46 | 7.1 | 1140 |
| 10 | 1.5 | 0.71 | 10.9 | 760 |

Figure 4:
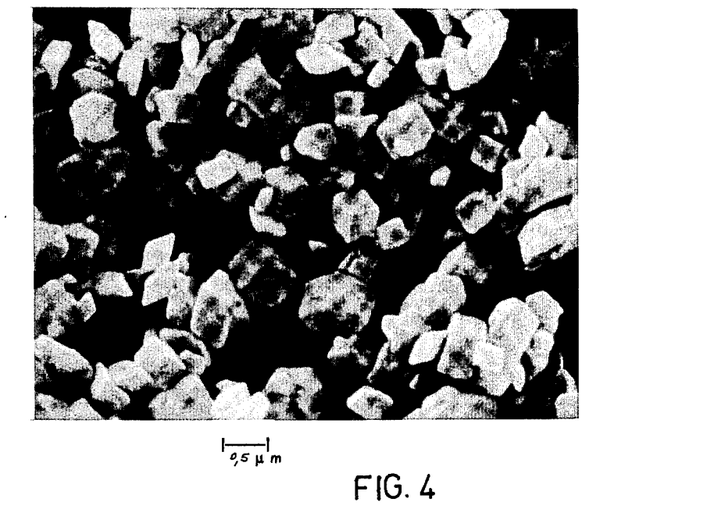
FIG. 4 is a photomicrograph of the product of Example 8 hereinbelow.
Figure 5:
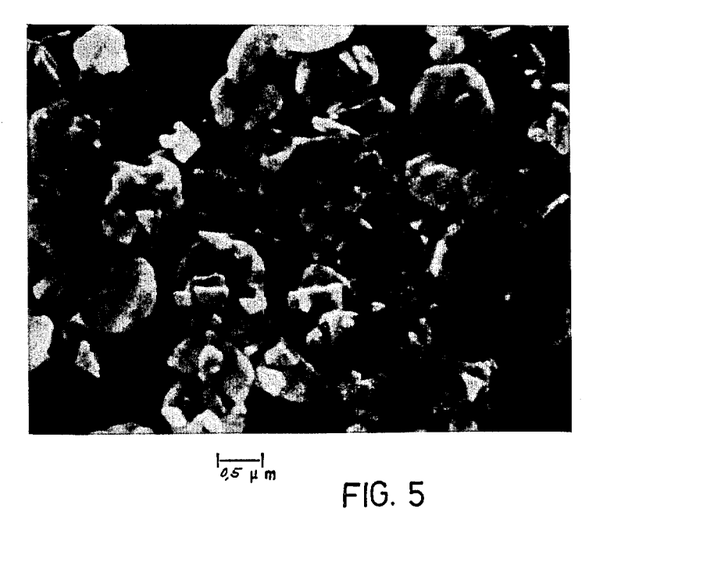
FIG. 5 is a photomicrograph of the product of Example 10 hereinbelow.

The product obtained in accordance with the procedures of Example 8 is shown in FIG. 4 in the form of a photograph taken with an electron scan microscope, and the product of Example 10 is similarly shown in FIG. 5. The influence of the $SiO_2$ on the crystal geometry can clearly be seen by comparing the two figures.

Table 4 below shows the measured color values according to the CIELAB color system.

TABLE 4

| Example No. | $L^*$ | $C_{ab}^*$ | $H°$ |
|---|---|---|---|
| 8 | 34.3 | 24.2 | 28.8 |
| 9 | 36.4 | 23.7 | 28.1 |
| 10 | 41.6 | 27.9 | 37.6 |

EXAMPLE 11

25 g of the α-FeOOH used in Example 1 was suspended in 500 ml of 8 N NaOH and 0.25 g of $GeO_2$ was added to the resulting suspension. The suspension was then hydrothermally treated in an autoclave for 4 hours at 200° C. Accordingly, the procedure corresponds to that of Comparison Example 1 apart from the $GeO_2$ addition. The hematite crystals obtained showed a pronounced metallic sheen for a yellowish red color which is very similar to that of copper bronze. The color values were as follows: $L^* = 52.8$, $C^*_{ab} = 17.8$ and $H° = 38.3$. Comparison of the color values measured in accordance with the CIELAB color system shows the substantial colorimetric consistency of the product of this example with the products of Examples 3 and 7. The product had a BET surface of 2.5 m²/g.

EXAMPLE 12

(Comparison Example)

An aqueous suspension of α-FeOOH corresponding to that used in Example 1 was adjusted to a pH value of 2 by the addition of a little sulphuric acid. Thereafter the suspension had a solids concentration of 50 g/l. 500 ml of this mixture was hydrothermally treated in an autoclave for 4 hours at 250° C. The end product was then separated from the mother liquor, washed with water and dried at 120° C. It had the properties shown in Table 5.

EXAMPLES 13 TO 17

The procedure followed was exactly the same as that set out in Comparison Example 12, except that different quantities of foreign substances influencing the growth of the hematite crystals were added to the suspension of α-FeOOH before the hydrothermal treatment. Zn(II) and Ti(IV) compounds were used in the form of $ZnSO_4$ (Examples 13, 14) and $TiOSO_4$ (Examples 15 to 17), respectively. The quantities of these additions in the suspension and in the end product and also the properties of the hematite samples isolated after the hydrothermal treatment are shown in Table 5. As in cases where $SiO_2$ was added, the BET surfaces and the lightness values again increased with the quantity of growth-influencing substance added in the manner typical of lamellar iron oxide (cf. Tables 3 and 4)

TABLE 5

| Example No. | Addition in the suspension (% by weight based on Fe—content) | Addition in the end product (% by weight) | BET surface (m²/g) | Color values | | |
|---|---|---|---|---|---|---|
| | | | | $L^*$ | $C_{ab}^*$ | $H°$ |
| 12 (Comparison) | — | — | 1.8 | 30.0 | 10.0 | 15.2 |
| 13 | 0.8% $ZnSO_4$ | not determined | 2.6 | 33.5 | 9.9 | 17.6 |

TABLE 5-continued

| Example No. | Addition in the suspension (% by weight based on Fe—content) | Addition in the end product (% by weight) | BET surface (m²/g) | Color values L* | Color values $C_{ab}^*$ | Color values H° |
| --- | --- | --- | --- | --- | --- | --- |
| 14 | 1.6% ZnSO₄ | 0.31% ZnO | 3.2 | 35.7 | 10.4 | 21.9 |
| 15 | 0.95% TiOSO₄ | 0.30% TiO₂ | 1.9 | 31.2 | 8.2 | 12.4 |
| 16 | 1.90% TiOSO₄ | not determined | 2.3 | 32.3 | 7.6 | 13.5 |
| 17 | 2.86% TiOSO₄ | 0.75% TiO₂ | 2.6 | 34.0 | 7.5 | 16.3 |

EXAMPLE 18
(Comparison Example)

The procedure followed was exactly the same as that set out in Example 12, except that the hydrothermal treatment was carried out at 300° C. The properties of the product obtained are set out in Table 6.

EXAMPLES 19 AND 20

The procedure followed was exactly the same as that set out in Example 18, except that different quantities of phosphoric acid were additionally added to the α-FeOOH suspension. The quantities of H₃PO₄ and the properties of the products isolated after the hydrothermal treatment are set out in Table 6. The effect of the phosphate ions on the crystal growth of the hematite can be seen from the color values typical of lamellar α-Fe₂O₃ and the BET surfaces increasing with and the crystallite sizes decreasing with increasing quantity of phosphate.

TABLE 6

| Example No. | H₃PO₄ in the suspension (% by weight, based on Fe content) | Phosphate in the end product (% by weight) | BET-surface (m²/g) | X-ray crystallite size (A) | Color values L* | Color values $C_{ab}^*$ | Color values H° |
| --- | --- | --- | --- | --- | --- | --- | --- |
| 18 (Comparison) | — | — | 2.0 | >2000 | 29.9 | 10.7 | 15.1 |
| 19 | 0.16 | not determined | 3.0 | >2000 | 32.5 | 14.3 | 20.0 |
| 20 | 0.80 | 0.54 | 8.6 | 860 | 40.1 | 22.4 | 34.5 |

EXAMPLE 21

50 g of iron oxide hydroxide which was the same as that used in Example 7 was suspended in 0.5 l of 8 N NaOH, followed by the dropwise addition with vigorous stirring of an aqueous solution of 5.4 g of CoSO₄. Thereafter 4.5 g of K₂S₂O₈ was added to oxidise the cobalt and the suspension was thoroughly mixed. The following hydrothermal treatment was carried out at 240° C. and lasted 4 hours. Lamellar hematite crystals having a cobalt(III)-content of 4% by weight were obtained. This material was reduced with moist hydrogen for 15 minutes at 350° C. and then for 45 minutes at 370° to 380° C. The lamellar cobalt-containing magnetite which was obtained had an FeO-content of 26% and showed the following magnetic powder data: coercive force 481 Oe, remanence 426 G cc g⁻¹. Subsequent oxidation in a stream of air at 150° to 200° C. gave a cobalt-containing magnetite containing 19% of FeO and having the following magnetic powder data: coercive force 681 Oe, remanence 433 G cc g⁻¹. A magnetic tape having a coercive force of 785 Oe was produced with this material. The $B_r/B_s$-value measured in the tape direction amounted to 0.5 as was expected theoretically.

It will be appreciated that the instant specification and examples are set forth by way of illustration and not limitation, and that various modifications and changes may be made without departing from the spiring and scope of the present invention.

We claim:

1. Synthetic, hexagonal, lamellar iron oxide particles substantially homogeneously about 0.1 to 12% by weight of at least one oxide of an element of the IVth, Vth or VIth Main and Secondary Groups and of the IInd Secondary Group of the Periodic System of elements.

2. Iron oxide particles as claimed in claim 1, containing at least one of the oxides of silicon, germanium, zinc, titanium, zirconium and phosphorus.

3. Iron oxide particles as claimed in claim 1, containing about 0.1 to 9% by weight of at least one of the oxides of silicon, germanium and phosphorus.

4. Iron oxide particles as claimed in claim 1, containing about 0.1 to 5% by weight of SiO₂.

5. Iron oxide particles as claimed in claim 1, additionally containing at least one oxide of an element of the Third Main Group of the Periodic System.

6. Iron oxide particles as claimed in claim 1, additionally containing at least one of the oxides of manganese, cobalt, nickel and rhodium.

7. Iron oxide particles as claimed in claim 1, having the crystal structure of hematite.

8. In the hydrothermal production and growth of hexagonal lamellar α-iron oxide particles, the improvement which comprises effecting such growth in the presence of at least one compound of an element of the IVth, Vth or VIth Main and Secondary Groups and of the IInd Secondary Group of the Periodic System of elements whereby the resulting particles are hexagonal and lamellar and the ratio of lamella diameter to lamella thickness thickness depends on the added amounts of said elements.

9. A process as claimed in claim 8, in which said element is germanium, titanium or zirconium.

10. A process as claimed in claim 8 in which said element is silicon, germanium or phosphorus.

11. A process as claimed in claim 8, in which said element is silicon.

12. A process as claimed in claim 8, growth of the hexagonal, lamellar—iron oxide particles being effected in the presence of at least one compound of the elements manganese, cobalt, nickel and rhodium in the trivalent oxidation state.

13. A process as claimed in claim 8, in which the principal compound from which the particles are being grown are iron(III)-compounds, growth being affected in aqueous solution or suspensions at a temperature above that at which there occurs complete conversion of the compound used into α-iron oxide, at least above 100° C.

14. A process as claimed in claim 13, the process including the further steps of separating the lamellar hematite crystals, washing them, and converting them into hexagonal lamellar magnetite or maghemite.

15. Iron oxide particles according to claim 1 present as a corrosion-inhibiting or decorative colored pigment in a synthetic resin, plastic, glaze or enamel.

16. A magnetic recording support, magneto-optical display or storage device including a ferrite with the crystal structure of spinel or barium hexaferrite and made from iron oxide particles according to claim 1.

\* \* \* \* \*

UNITED STATES PATENT AND TRADEMARK OFFICE
CERTIFICATE OF CORRECTION

PATENT NO. : 4,404,254

DATED : September 13, 1983

INVENTOR(S) : Gerhard Franz et al

It is certified that error appears in the above-identified patent and that said Letters Patent is hereby corrected as shown below:

Col. 3, line 39 — Delete "compouns" and insert --compounds--

Col. 4, line 29 — Delete "effect" and insert --affect--

Col. 5, line 50 — Delete "systems" and insert --system--

Col. 10, line 19 — After "homogenously" insert --containing--

Signed and Sealed this

Ninth Day of October 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,404,254
DATED : September 13, 1983
INVENTOR(S) : Gerhard Franz, et al It is certified that error appears in the above-identified patent and that said Letters Patent is hereby corrected as shown below:

Col. 12, line 19   Before "substantially" insert --containing--

Signed and Sealed this

Fifth Day of March 1985

[SEAL]

Attest:

DONALD J. QUIGG

*Attesting Officer*   *Acting Commissioner of Patents and Trademarks*